INTEGRATED SEMICONDUCTOR SWITCH SYSTEM

Filed Aug. 15, 1966 5 Sheets-Sheet 1

INVENTOR
Jearld L. Hutson

BY Thomas A. Harwood
ATTORNEY

INVENTOR
Jearld L. Hutson
BY Thomas G. Harwood
ATTORNEY

INVENTOR
Jearld L. Hutson
BY Thomas A. Harwood
ATTORNEY

Oct. 28, 1969 J. L. HUTSON 3,475,666

INTEGRATED SEMICONDUCTOR SWITCH SYSTEM

Filed Aug. 15, 1966 5 Sheets-Sheet 4

INVENTOR

Jearld L. Hutson

BY Thomas A. Harwood

ATTORNEY

Oct. 28, 1969 J. L. HUTSON 3,475,666

INTEGRATED SEMICONDUCTOR SWITCH SYSTEM

Filed Aug. 15, 1966 5 Sheets-Sheet 5

INVENTOR
Jearld L. Hutson

BY Thomas A. Harwood

ATTORNEY 3,475,666
INTEGRATED SEMICONDUCTOR SWITCH SYSTEM
Jearld L. Hutson, 907 Newberry,
Richardson, Tex. 75080
Filed Aug. 15, 1966, Ser. No. 572,608
Int. Cl. H01l 11/00; H03k 19/08
U.S. Cl. 317—235 23 Claims

ABSTRACT OF THE DISCLOSURE

An electronic switch system comprises a switch element that includes first and second integrated regenerative devices having at least one common region, wherein one of the devices constitutes a power device, and the other of the devices constitutes a control device. The two devices are switched sequentially, the power device in response to the control device, when the control device causes current carriers to be injected into the common region. Circuit means interconnects the control device with the power device to cause the control current to be applied to the control device to switch the latter when voltage is applied across the power device.

The development of the semiconductor controlled rectifier device some years ago created a new technology within the semiconductor device industry directed to electrical switching applications. The basic semiconductor controlled rectifier type device consists of four regions of alternate electrical conductivity types incorporated within a single semiconductor body, the operation of which is well known to those familiar in the art. This type of device is asymmetrical in its operation and is primarily used for half-wave power control. By selective use of two of these devices, full wave power control can be achieved, again all of which is well known in the art.

Many variations and innovations have been made to the semiconductor controlled rectifier to incorporate within a single device a symmetrical switching action for full wave power control of an alternating voltage source. These devices are variously referred to as the Triac, the semiconductor symmetrical switch, and various other names. All of these devices are characterized by multiple regions of alternate electrical conductivity types incorporated with in a single body of semiconductor material, and all have in excess of four regions. One of the simpler of the symmetrical switch type devices has five regions, four of which are used for switching or conducting during one half cycle of an A.C. voltage source, and wherein three of these same regions and the fifth region are used for conducting during the alternate half cycle of the voltage source.

All of the semiconductor switching devices, whether characterized by asymmetrical or symmetrical operation, have a pair of conduction electrodes and exhibit a normally high impedance state between these electrodes. The devices can be switched to a low impedance or conduction state in the presence of a voltage applied across the conduction electrodes by either applying a signal to the conduction electrodes or to a third electrode usually referred to as a control electrode or gate.

Although some of the symmetrical switching devices heretofore developed have only two electrodes (conduction electrodes) and are switched by means of these electrodes, such as in the case of the rate-of-rise turn-on function for a switching device, many other of the devices employ an additional control electrode by which it is switched. The latter type devices are generally characterized by a greater flexibility and control of operation, and more diverse applications.

Several problems have been encountered in the utilization of the three electrode-type switching devices, both asymmetrical and symmetrical in operation. As to the asymmetrical switching device, such as the semiconductor controlled rectifier, it is common to employ a unijunction transistor connected to the control electrode for switching the semiconductor controlled rectifier at selected times during the proper half cycle of the alternating voltage source. This scheme has had wide acceptance, primarily for the reason that it is highly controllable, is not subject to erratic firing at uncontrolled times during the half cycle and is characterized by a current mode switching function. The latter is very important in the overall operation of semiconductor switching systems, and thus a brief description of this turn-on mode will be given here.

The most effective means for turning on or switching a semiconductor controlled rectifier is to inject current carriers into one of the intermediate base regions. This is accomplished by forward biasing the rectifying junction between this base region and the emitter region contiguous thereto to which one of the conduction electrodes is attached. This causes the emitter region to inject current carriers back into the base region which cross into the wide base region. As further current carriers are injected internally within the device due to junction action, the sum of the gains of the two equivalent transistors of the semiconductor controlled rectifier attains or exceeds unity, which is the condition for regenerative action. The device then switches to the low impedance state and remains in this state for as long as the voltage applied across the conduction electrodes is of sufficient magnitude to sustain the minimum holding current. This is exactly the gate signal turn-on mode that takes place when a semiconductor controlled rectifier is switched in the conventional manner by a unijunction transistor connected externally thereto by means of the gate or control electrode.

Although the above described system has desirable turn-on and control characteristics, it has been avoided to a large extent because of the cost involved in the use of the two separate devices, namely the semiconductor controlled rectifier and the unijunction transistor control element. Other schemes have been devised that also employ another device separate from the controlled rectifier but which is less expensive. For example, some systems employ an npn or pnp switch element connected to the gate electrode of the controlled rectifier which is caused to break down with a reverse voltage applied across one of the junctions thereof to apply gate current to the controlled rectifier. Normally, a capacitor is used in conjunction with this type of device in which energy is stored for injecting the gate current into the controlled rectifier. One undesirable aspect of this arrangement is the energy dissipated when the breakdown voltage of the junction is attained. This system is also subject to erratic firing by leaving an unknown residual charge on the capacitor that develops after the capacitor has been discharged.

Although the unijunction control element for switching power devices is useful for asymmetrical type devices, the conventional system and electrical connections used therewith are generally not applicable to symmetrical type devices.

Semiconductor power switches that employ a gate or control electrode are usually designed so that the control electrode is attached to the base region of the device that is contiguous to a high efficiency emitter of the device. The purpose of this is to enable the use of a relatively small gate or control current to cause the device to switch. Attaching the control electrode to a relatively low electrical conductivity (high mobility) base region, such as the normally wide base region of a conventional semiconductor controlled rectifier, or the middle base region of a conventional symmetrical switch, generally dictates that a much larger gate or control current must be injected into this region in order to cause the main device to become regenerative. The reason is that this region is usually not contiguous to a high efficiency emitter region, and the current carriers must live longer in the wider base region in order to reach the junctions. In fact, such a large current injection into this region is required in conventional devices that it becomes impractical to use this particular scheme.

The present invention is directed to a new concept of controlling the operation of a semiconductor power switch, either of the asymmetrical or symmetrical type, in which all of the desirable features of conventional systems are employed but which eliminates all the undesirable features that have been enumerated above. The system of the invention, including the devices used therewith, employs a main switch device in which a control electrode is interconnected with what is conventionally known as the relatively low electrical conductivity, wide base region of either the asymmetrical or symmetrical type devices. The invention also employs a current turn-on mode as contrasted to a voltage crest or junction breakdown turn-on mode. The current turn-on mode can also be thought of as occurring when a rectifying junction is forward biased to enable the flow of the control current for switching the main device, such as in the case of the control of operation of the conventional semiconductor controlled rectifier with a unijunction transistor interconnected with the gate electrode thereof.

The system of the invention comprises a pair of integrated regenerative switch devices that share at least one active region in common. One of the devices constitutes the main power switch device, whereas the other device constitutes a control switch device for causing the main device to switch. A control electrode is attached to one of the regions of the control switch device, and conduction electrodes are attached to the main switch device. Circuit means are provided that interconnect the control electrode with the conduction electrodes, and is responsive to voltage applied across the conduction electrodes to apply a control current through the control electrode to cause the control device to become regenerative. The control device is switched to the regenerative state by a current turn-on mode which occurs when a junction located within the control device is forward biased to permit the injection of current carriers into one of the regions thereof. As the control device becomes regenerative, it causes the injection or flooding of current carriers into the common region shared by the two devices, which causes the main switch device to become regenerative.

Generally speaking, the common region shared by the two devices comprises the normally wide base region of either the asymmetrical or symmetrical type devices. This particular region usually constitutes the original wafer of semiconductor material from which the device is fabricated, and consequently has a relatively low electrical conductivity. At the same time, however, this region has a relatively high mobility and lifetime for carriers injected therein, and allows most of the injected current carriers to live long enough within this region to reach rectifying junctions contiguous therewith under the influence of the electric field applied across the conduction electrodes of the main device.

The current turn-on mode of the control device is very important and is effected by applying a control current, or injection of current carriers, across a forward biased rectifying junction between two regions of this device. In some embodiments of the invention, the integrated control device and main switch device have more than one region in common, wherein one of the conduction electrodes of the main device also serves as one of the conduction electrodes of the control device. Moreover, the control electrode in some embodiments, also constitutes one of the conduction electrodes of the control device. In other embodiments of the invention, only one region is shared in common between the two integrated devices.

Although only a small control current is required to cause the control device to switch, this control current is preferably of a magnitude that would be derived from applying a substantial number of volts across a forward biased junction. In contrast to this, the mere application of little more than the forward bias voltage across a junction to inject current carriers into the control device is not adequate for causing the control device to become regenerative as a practical matter. The circuit means of the invention that interconnects the conduction electrodes of the main switch device with the control electrode of the control device causes the application of a substantial current to the control electrode that is much greater than that which would be derived from just barely forward biasing a rectifying junction. In fact, the circuit means produces a substantial number of volts from which the control current is derived. This circuit means comprises, in the preferred embodiment, voltage divider means for deriving a voltage intermediate the line voltage applied to the conduction electrodes of the main switch device. Such a voltage divider arrangement also ideally lends itself to the control of a symmetrical semiconductor switch device so that perfect symmetry of operation is achieved. In one embodiment, the control electrode is interconnected through the control switch device to the middle base region of a symmetrical device so that a control current of the same polarity is employed for both half cycles of the alternating voltage source applied across the conduction electrodes of the main switch device. This permits the use of any suitable D.C. switch means to control the application of the control current to the system.

Because of the new concept of the system of the invention, many novel devices are provided, including the provision of a novel device used in the external circuit means as a D.C. switch. The latter device constitutes an improvement of a conventional unijunction transistor which exhibits a very low impedance to current flow between the two base electrodes thereof when the unijunction transistor is gated on by a control current applied to the emitter electrode. In a preferred embodiment thereof, this improved device includes at least one additional region, including a rectifying junction associated therewith, contiguous to the channel region of the device, which rectifying junction becomes forward biased when the device is gated on to modulate the electrical conductivity of the channel region.

Many other objects, features and advantages of the present invention will become apparent from the following detailed description thereof when taken in conjunction with the appended claims and the attached drawing wherein like reference numerals refer to like parts throughout the several figures, and in which:

Figure 1:
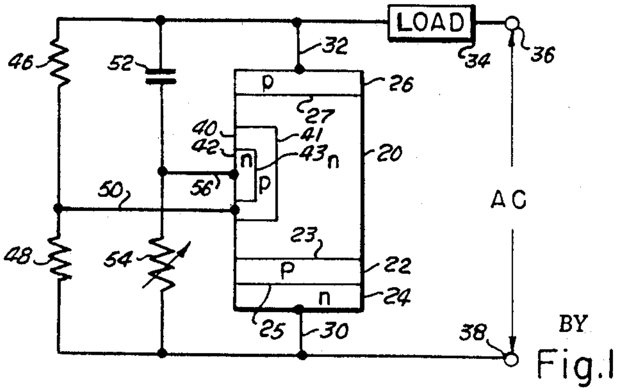
FIGURE 1 is an electrical schematic diagram of one embodiment of the system of the invention employing an asymmetrical semiconductor switch.

One embodiment of the invention which employs an asymmetrical semiconductor switch with a control electrode interconnected with one of the base regions of the device is shown in the electrical schematic diagram of FIGURE 1. A body 20 of semiconductor material, such as n-type conductivity silicon, for example, constitutes the original starting material from which the semiconductor switch is fabricated. A first p-type conductivity region 22 is formed contiguous to the n-type region 20 and defines a rectifying junction 23 therewith. An n-type conductivity region 24 is formed contiguous with the p-type region 22 and defines another rectifying junction 25 therewith. Another p-type region 26 spaced from region 22 is formed contiguous with the n-type conductivity region 20 and defines a rectifying junction 27 therewith. Conduction terminals 30 and 32 are attached to regions 24 and 26, respectively. The structure described thus far is similar to a conventional semiconductor controlled rectifier with the exception that a control electrode is not applied or attached to the p-type base region 22. The various regions 22, 24 and 26 can be formed in any suitable manner, such as by diffusing impurities into the surfaces of the original wafer 20 using suitable masking techniques, all as is well known.

Conventionally, the n-type starting wafer 20 is characterized by a normally low electrical conductivity, or high carrier mobility, whereas p-type region 22 has a substantially higher electrical conductivity. The n-type region 24 is conventionally highly doped with impurities to constitute an efficient emitter for the device. The normal classifications of the various regions of the device are the wide base region 20, the narrow base region 22, and the two emitter regions 24 and 26.

The switch device has application for controlling the switching of current through a load 34 by connecting the conduction electrodes 30 and 32 of the device in series with the load and a source of alternating voltage through terminals 36 and 38. As is commonly known, the switch device exhibits a normally high impendance between the conduction electrodes, but can be switched to a low impendance state by injecting current carriers into one of the regions thereof in the presence of a voltage applied across the conduction electrodes to cause the device to become regenerative. Once switched, the device remains in a conducting state so long as the minimum holding current is conducted by the conduction electrodes.

Current carrier injection means for switching the device is integrated in the main device, and in the embodiment shown, includes additional regions formed in the wide n-type base region 20 with a control electrode attached to at least one of these regions. Another p-type conductivity region 40 is formed contiguous with the wide n-type base region 20 and defines a rectifying junction 41 therewith, and another n-type region 42 is formed contiguous with the p-type region 40 and defines a rectifying junction 43 therewith. These regions can also be formed by suitable diffusion techniques.

The main switch device comprises the combination of regions 26, 20, 22 and 24 as noted earlier. Another auxiliary or control device, which also exhibits regenerative action under the proper conditions, is also formed integral with the main device upon the addition of regions 40 and 42. This device comprises the combination of regions 26, 20, 40 and 42, and it will be noted that the two integrated devices have at least one region that is common to both. In this embodiment, regions 20 and 26 are common to both devices.

A pair of serially connected resistors 46 and 48, constituting a voltage divider, are connected in series with the load 34 and the source of alternating voltage, and in parallel with the switch device across conduction terminals 30 and 32. A connection 50 is made from between the dividing resistors 46 and 48 to the p-type region 40. A capacitor 52 is connected between conduction electrode 32 and n-type conductivity region 42 by electrical connection 56, and variable resistor 54 is connected between n-type conductivity region 42 and the other conduction electrode 30.

Assuming that the polarity of voltage applied from the A.C. voltage source across the device is such that conduction electrode 32 is positive with respect to conduction electrode 30, the device can then be switched to the low impendance or conduction state. Under this condition applied voltage, rectifying junctions 25 and 27 will be forward biased. By reason of the connection 50 between the dividing resistors 46 and 48 and the p-type region 40, a voltage intermediate the voltage applied across conduction electrodes 30 and 32 is applied to p-type region 40. No voltage is initially established across capacitor 52 so that electrode 56 is initially at the voltage of conduction electrode 32, whereas a voltage is devoloped across this capacitor at a time rate determined by the RC time constant of capacitor 52 and variable resistor 54. Consequently, the voltage applied to n-type region 42 through electrode 56 is initially positive with respect to the voltage applied to p-type region 40, so that rectifying junction 43 is initially reverse biased. As capacitor 52 continues to charge, the voltage at electrode 56 decreases with respect to the voltage applied to p-type region 40 until rectifying junction 43 becomes forward biased. At this time, current as supplied by the charge on capacitor 52 is conducted across rectifying junction 43, which constitutes the injection of current carriers into the base region 40 of the control device. This occurs in the presence of the proper polarity voltage applied across the conduction electrodes of this control device (electrodes 32 and 56), so that this device becomes regenerative. Consequently, the n-type base region 20 common to both devices is flooded with current carriers, and under the influence of the voltage applied across conduction electrodes 30 and 32, causes the main device to become regenerative and switch to the low impendance or conduction state.

Some important points of this system should be noted. First of all, a relatively large current (high concentration of injected current carriers) is required to switch the main device since the carriers are being injected into the wide base region 20. In other words, the current required is larger than that which is required when injected into the other base region 22, since the latter is contiguous to a high efficiency emitter region 24. The greater injected carrier concentration is made possible by the regenerative action of the integrated control device which shares region 20 in common with the main device. A very positive switching action for the control devices is made possible by the current injection capability of capacitor 52, and the relatively large charge developed on the capacitor is made possible by the relatively large voltage derived from the voltage dividing resistors. As already noted, the capacitor charges to a voltage magnitude of the voltage at the dividing resistors plus the forward bias voltage across junction 43. The relatively large capacitor voltage cannot be achieved without the voltage divider deriving a voltage intermediate the line voltage.

It is also important to note that the mode of switching either of the two integrated devices does not include the reverse biasing of any rectifying junction by a voltage sufficient to cause the junction to break down. Nor does the turn-on mode require a voltage pulse applied across a reverse biased junction with a rate of rise sufficient to utilize the capacitance effect of the reverse biased junction to cause switching. Thus the system is not characterized by any of the disadvantages attendant to voltage crest or junction breakdown switching. The turn-on mode of the system of this invention is by current injection alone, and is controlled by the injection of current across a forward biased junction. Such a mode is referred to as current mode switching.

The time during the positive half cycle that junction 43 becomes forward biased depends upon the RC time constant of capacitor 52 and resistor 54. Of course, resistor 54 can be varied to cause the device to switch at any point in the positive half cycle from the beginning thereof to very nearly the end thereof.

As the voltage during the same positive half cycle of the A.C. voltage source decreases to zero, the voltage applied to p-type region 40 from the dividing resistors 46 and 48 will likewise decrease to zero. The rate of change of voltage across the conduction terminals of the device is also reflected across the capacitor 52. Should there be a residual charge on capacitor 52 as the applied voltage approaches zero, the capacitor will be discharged to a voltage substantially equal to the forward voltage drop across junction 43. This is caused by the voltage applied to connection 56 becoming negative with respect to the voltage applied to p-type region 40, so that junction 43 becomes forward biased to discharge capacitor 52. It is important that the capacitor is always discharged to the same voltage for the beginning of the next positive half cycle so that switching of the device occurs at the same point in each positive half cycle. During the negative half cycle, junction 43 is always forward biased to maintain the capacitor discharged to the same voltage, which is approximately the forward voltage across junction 43.

Figure 2:
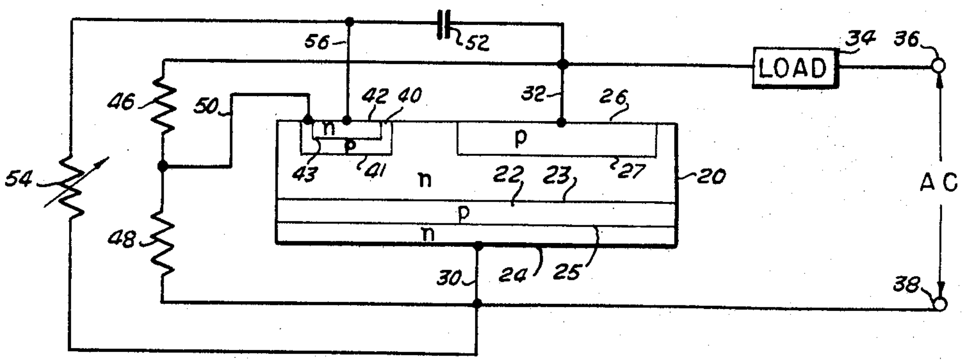
FIGURE 2 is a side elevational view, in section, of one embodiment of an asymmetrical semiconductor switch that can be employed as the switch shown schematically in FIGURE 1, including the circuitry associated therewith.

A side elevational view, in section, of one embodiment of the asymmetrical switch device just described is shown in FIGURE 2, along with the circuitry associated therewith. Here, corresponding reference numerals refer to corresponding parts. In this embodiment, the original n-type starting material 20 comprises a semiconductor wafer into the opposite faces of which there are diffused p-type conductivity determining impurities to form p-type regions 22, 26 and 40, whereby regions 26 and 40 are spaced apart and formed in the same surface of the device and region 22 is formed in an opposite surface. It should be noted, however, that region 40 can alternatively be formed in the opposite surface of the device limiting regions 22 and 24 to only a part of this surface. The device shown is of planar construction wherein suitable masking techniques (well known) are employed to make the selected diffusions. An n-type region 24 is diffused into p-type region 22, and simultaneously, n-type region 42 is diffused into region 40. All of the diffusion and masking techniques are well known and will not be described here. The electrical circuitry and components are the same as for FIGURE 1 and are connected to the same regions of the device as previously described.

In the device of FIGURE 2, the main switch device comprises the n-type emitter 24, the p-type base 22, the n-type base 20 and the p-type emitter 26. The current injecting means, or control switch device, integrated with the main device comprises the n-type region 42, p-type region 40, n-type region 20 and p-type region 26. Current carriers injected by the regenerative action of the last mentioned device flood into the n-type base region 20 between the two p-type regions 22 and 26, thus causing the main switch device to become regenerative and to switch.

Figure 3:
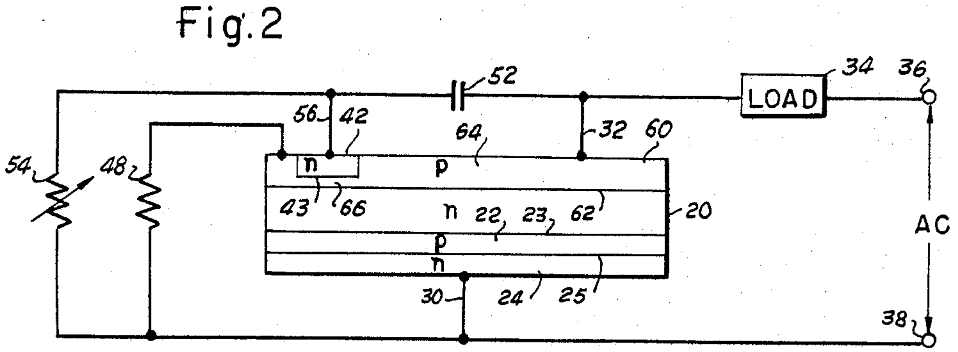
FIGURE 3 is a side elevational view, in section, of another embodiment of an asymmetrical semiconductor switch and the external electric circuitry for controlling the operation thereof.

Another embodiment of an asymmetrical switch device very similar to that just described is shown in the side elevational view, in section, of FIGURE 3, along with the electrical circuitry associated therewith. Again, the device is of planar construction wherein p-type regions 22 and 64 are diffused into opposite surfaces of the wafer. The n-type region 24 is diffused into p-type region 22 simultaneous with the diffusion of n-type region 42 into one side of p-type region 64. Conduction electrode 32 is attached to a zone 60 of p-type region 64 that is spaced from n-type region 42 by a substantial distance, so that a substantial lateral resistance to current flow is provided between region 42 and zone 60 through region 64. Connection 50 from voltage divider resistor 48 is attached to region 64 adjacent region 42 on the opposite side thereof from electrode 32. All other external components and circuitry are the same, with the exception of the elimination of the separate and distinct voltage dividing resistor 46. The equivalent of this resistor comprises the lateral resistance of region 64 between zone 60 and the zone 66 of p-type region 64 located directly beneath region 42. The control switch device then comprises region 42, zone 66 of region 64, region 20 and zone 60 of region 64. The operation of the device, however, is essentially the same as described with reference to FIGURES 1 and 2.

Figure 4:
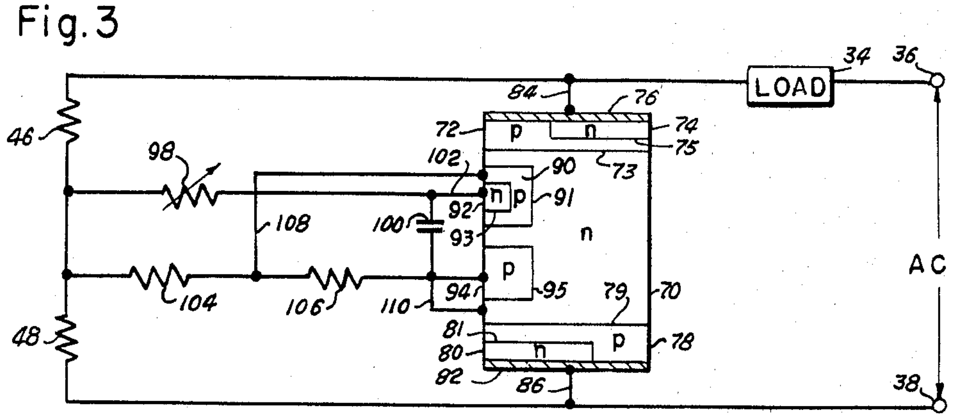
FIGURE 4 is an electrical schematic diagram of another embodiment of the system of the invention employing asymmetrical semiconductor switch and the control circuitry associated therewith.

A further embodiment of the invention that employs a symmetrical semiconductor switch is shown in the electrical schematic diagram of FIGURE 4. A body 70 of semiconductor material, such as n-type conductivity silicon, for example, is used as the starting wafer, and a p-type conductivity region 72 is formed contiguous thereto with a rectifying junction 73. An n-type conductivity region 74 is formed contiguous with p-type region 72 and defines a rectifying junction 75 therewith. The n-type region 74 does not include the entire surface of the wafer in this embodiment as junction 75 intersects this surface, so that p-type region 72 and n-type region 74 have adjacent surface portions. A conduction electrode 76 is attached to the surface adjacent portions of both p-type region 72 and n-type region 74. A conduction terminal 84 is attached to electrode 76 for interconnection with a load 34 and the AC voltage source applied to terminals 36 and 38.

Another p-type region 78 is formed contiguous to region 70 in spaced relation to region 72, and defines a junction 79 with region 70. Another n-type region 80 is formed contiguous to p-type region 78 and defines a rectifying junction 81 therewith, wherein regions 78 and 80 also have surface adjacent portions. Another conduction electrode 82 is attached to the surface adjacent portions of both of these regions, and another conduction terminal 86 is attached to electrode 82 for interconnection with the AC voltage source.

The device described thus far is similar to a conventional symmetrical switch, wherein regions 72, 70, 78 and 80 are active for conduction during the positive half cycle of the AC voltage source, and regions 74, 72, 70 and 78 are active for conduction during the negative half cycle.

Another p-type region 90 is formed contiguous with the original wafer material 70 in spaced relation with regions 72 and 78, and defines a rectifying junction 91 with region 70. Another n-type region 92 is formed contiguous with p-type region 90 and defines a rectifying junction 93 therewith. An additional p-type region 94 is formed contiguous with the n-type base region 70 in spaced relation to all other regions, and defines a rectifying junction 95 with region 70. The combination of n-type region 92, p-type region 90, p-type region 94 and the portion of n-type 70 adjacent and between p-type regions 90 and 94 constitutes an effective four region asymmetrical semiconductor switch device all included within or contiguous to region 70, and can be caused to become regenerative by the injection of current carriers into one of the regions thereof in the presence of a voltage applied across it, conduction electrodes. In this device, n-type region 92 constitutes an emitter region to which a conduction electrode is attached, and p-type region 94 constitutes another emitter region to which another conduction electrode is attached, with regions 90 and 70 constituting effective base regions. It will be understood that the reference to the term conduction electrodes of this device is distinguished from the conduction electrodes 76 and 82 of the main symmetrical switch device.

Series connected voltage dividing resistors 46 and 48 are connected in series with a load 34 and the source of AC voltage as noted earlier, with the voltage dividing resistors and the conduction electrodes of the main switch being connected in parallel.

A variable resistor 98 is connected at one terminal to the interconnection of the voltage dividing resistors 46 and 48 and at the other terminal to the n-type region 92. A capacitor 100 is connected between the n-type region 92 and the p-type region 94. Series connected resistors 104 and 106 are connected between voltage dividing resistors 46 and 48 at one terminal of resistor 104 and to the p-type region 94 at one terminal of resistor 106. An electrical connection 108 is connected between the series connected resistors 104 and 106 and to the p-type region 90. An electrical connection 110 is connected between the p-type region 94 and the middle n-type base region 70 of the main switch at a point on the opposite side of p-type region 94 as p-type region 90.

The operation of the device will be described with reference to a positive voltage from the supply source applied to conduction terminal 84 with respect to conduction terminal 86. With this applied voltage polarity, rectifying junction 73 will be forward biased as will rectifying junction 81, with junction 79 being reverse biased. Thus the n-type region 70 is at substantially the same potential as conduction electrode 76 with the exception of the forward voltage drop across junction 73. P-type region 94 is also at the same potential as the n-type middle base region 70 by virtue of the electrical connection 110. The voltage established at the interconnection of voltage dividing resistors 46 and 48 is intermediate the voltage applied across conduction electrodes 76 and 82, and the voltage established between resistors 104 and 106 and applied to p-type region 90 through connection 108 is intermediate the last mentioned voltage and the voltage at middle n-type base region 70. The voltage applied to n-type region 92 is initially very near to the voltage of the n-type region 70 when capacitor 100 first begins to charge. Thus rectifying junction 93 will initially be reversed biased.

As capacitor 100 continues to charge, a voltage will be established on n-type region 92 sufficient to forward biased junction 93, the time for this voltage being attained being determined by the RC time constant of capacitor 100 and resistors 98 and 48. When junction 93 becomes forward biased, current is conducted across rectifying junction 93 as supplied by capacitor 100 to cause the device comprising regions 92, 90, 70 and 94 to become regenerative. This causes a large concentration of current carriers to be injected into region 70 which migrate to junctions 73 and 79 of the main device under the influence of the applied electric field. Thus the main device incomes regenerative and switches to the conduction state. During the negative half cycle of the supply voltage when the voltage applied to conduction terminal 86 is positive with respect to conduction terminal 84, the same potentials and polarities are applied to the middle n-type base region 70 and to all of the other regions of the control device. Consequently, the internal operational sequence is the same.

Capacitor 100 is positively discharged at the end of each half cycle. As the voltage applied across the conduction terminals of the main switch is reduced to zero at the end of each half cycle, the voltage applied to n-type region 92 will become negative with respect to the voltage applied to p-type region 90 prior to the end of the half cycle, thus causing the capacitor to discharge to the forward voltage drop across the junction.

An important feature of this system is that the control device is wholly integrated within the middle n-type base region 70 of the main device. The polarities of the voltage potentials applied to the various regions thereof are independent of the voltage polarity across the main device. In fact, these regions are essentially "floating," voltage-wise, at magnitudes intermediate the applied voltage. Before the control switch device becomes regenerative, connection 110 is effective to provide a charging path for capacitor 100. As the device becomes regenerative, junction 95 becomes active as an emitter of carriers. A relatively large voltage is provided to which the capacitor can charge to give a very positive switching function for auxiliary or control device. Finally, perfect symmetry of operation is achieved for both half cycles. All of this is made possible by the voltage divider network, wherein the system including the circuit means and integrated devices constitute, in effect, a bridge network. The voltage divider resistors 46 and 48 constitute two arms of the bridge, and the integrated devices constitute the other two arms. The circuitry between the voltage divider resistors and the integrated devices constitute the interconnection between opposite sides of the bridge network, wherein the same polarity current flows therein regardless of the polarity of voltage applied across the input to the bridge network, or across the conduction terminals of the main device.

Figure 5:
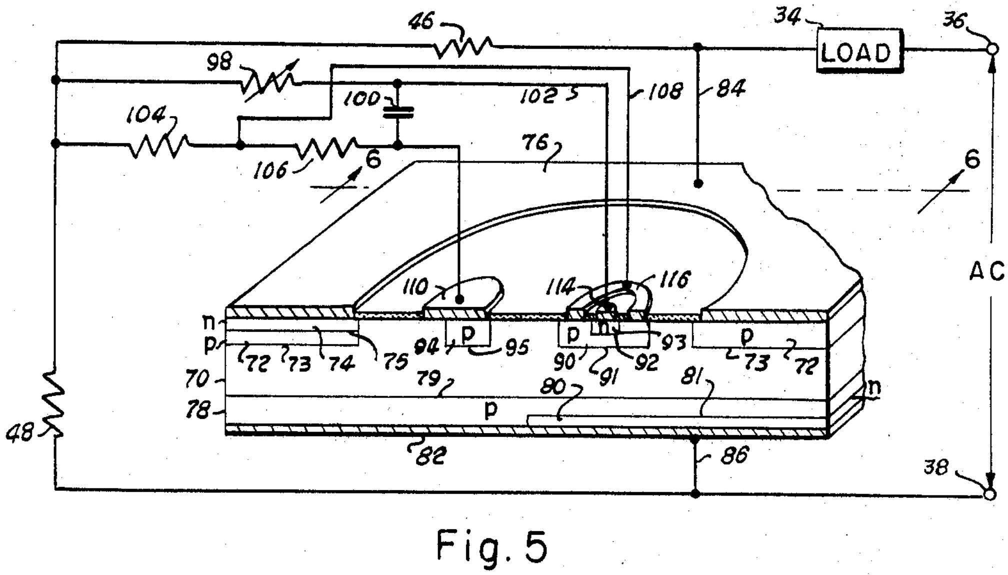
FIGURE 5 is a perspective view, in section, of one embodiment of a symmetrical semiconductor switch that can be employed as the switch shown schematically in FIGURE 4, including the electrical circuitry for controlling the operation thereof.
Figure 6:
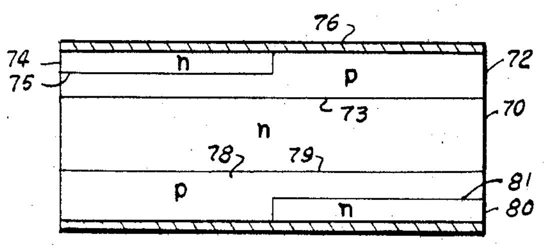
FIGURE 6 is an elevational view, in section, taken through section lines 6—6 of FIGURE 5.

A perspective view, in section, of one embodiment of the device shown schematically in FIGURE 4 is shown in FIGURE 5, along with the associated circuitry. Again, like parts are designated by like reference numerals. The device of FIGURE 5 is of planar construction, wherein the p-type region 72 is diffused into one surface of a wafer 70 constituting the original starting material. Region 72, in the embodiment shown, is formed in a generally annular configuration in the top surface of which part of the area in the center of the surface is masked. Simultaneously therewith, p-type regions 90 and 94 are formed in spaced apart relation within unmasked portions of the center part of the top surface At the same time, region 78 is formed in the bottom surface. Thereafter, n-type region 74 is formed in approximately one half of the surface area of p-type region 72 as is shown more clearly in the side elevational view, in section, of FIGURE 6 taken through section lines 6—6 of FIGURE 5. This junction 75 intersects the top surface to form surface adjacent portions of regions 72 and 74. Simultaneous therewith, n-type region 92 is formed in p-type region 90. At the same time, n-type region 80 is formed in part of region 73 to provide surface adjacent portions of regions 78 and 80. This n-type region is preferably semi-annular to corresponding in configuration and dimensions to that portion of p-type region 72 that does not include n-type region 74. Conduction electrode 76 is attached to the top surface of the wafer over the p-type region 72 and n-type region 74 so as to contact both regions. Electrode 82 is applied to the bottom surface to contact both regions 78 and 80. It will be noted that the portion of p-type region 78 that does include n-type region 80 is directly opposite the portion of p-type region 72 that includes n-type region 74 and vice versa. Thus a pair of asymmetrical, four region regenerative power switches are provided having common electrodes, wherein the two switches utilize in common p-type regions 72, n-type region 70 and p-type region 78.

Electrode 110 is attached to surface adjacent portions of p-type region 94 and n-type region 70, wherein this electrode contacts a surface of region 70 on the opposite side of region 94 as p-type region 90. An electrode 114 is attached to the n-type region 92 to which an electrical connection 102 from capacitor 100 is connected, and electrode 116 is attached to the surface of p-type region 90 to which the electrical connection 108 is connected to the interconnection of resistors 104 and 106. All other external electrical components and connections are the same as already described with reference to FIGURE 4.

This embodiment of the integrated device illustrates the symmetry of construction. The large concentration of carriers injected into the common region 70 between p-type regions 90 and 94 readily migrate out into the major portion of n-type region 70, flooding this region, and are influenced by the electric field to flow to junctions 73 and 79 of the main power device.

Figure 7:
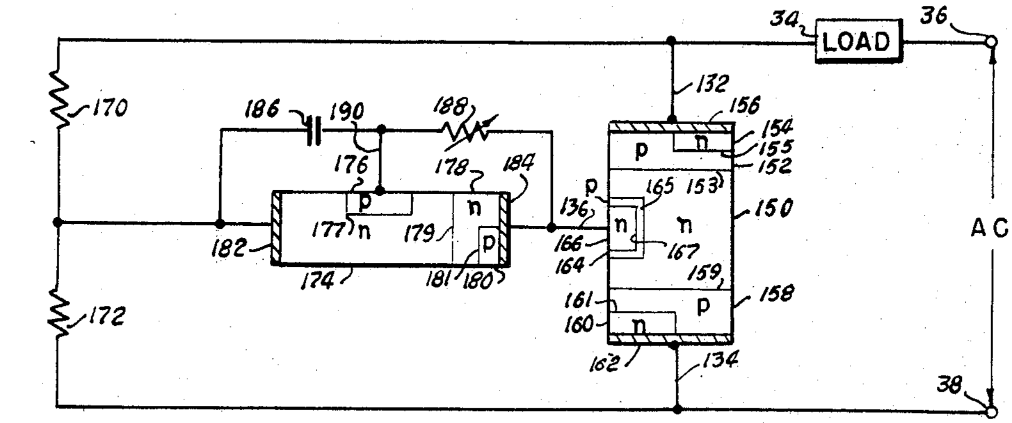
FIGURE 7 is an electrical schematic diagram of another embodiment of the system of the invention employing a semiconductor symmetrical triode switch in a symmetrical bridge circuit.

An electrical schematic diagram of another embodiment of the invention is shown in FIGURE 7, wherein a semiconductor symmetrical triode switch is connected at its conduction terminals 132 and 134 in series with the load 34 and the source of AC voltage applied to terminals 36 and 38. This embodiment also has the characteristic of a bridge network that employs a semiconductor symmetrical triode switch and a semiconductor DC switch means to control the operation of the symmetrical triode during the respective half cycles of the AC voltage source. The symmetrical switch comprises a body 150 of semiconductor material, such as n-type conductivity silicon, for example having a first p-type conductivity region 152 forming a junction 153 therewith, and an n-type conductivity region 154 contiguous to the p-type region 152 forming a junction 155 therewith that has a surface adjacent portion to region 152. A first conduction electrode 156 is attached to both the p-type region 152 and surface adjacent portion of n-type region 154. An opposite p-type region 158 is formed contiguous to the n-type region 150 with a rectifying junction 159 therebetween, and another n-type region 160 is formed in the p-type region 158 with a rectifying junction 161 therebetween, and has a surface adjacent portion to region 158. Another conduction electrode 162 is attached to both region 158 and the surface adjacent portion of region 160.

The device described thus far is the same as the corresponding portions of the device described in FIGURE 4. In the device under consideration, a gate or control electrode 136 is interconnected with the middle n-type region 150, so that a control current conducted thereby causes the main power device to switch to the low impedance state. The control electrode 136 is connected to a regenerative control device which comprises another p-type region 164 formed contiguous to n-type region 150 forming a rectifying junction 165 therewith, and another n-type region 166 formed within p-type region 164 defining a rectifying junction 167 therewith. The control device also includes n-type region 150 in common with the main power device, and p-type regions 152 and 158 during the positive and negative half cycles of the voltage supply when rectifying junctions 153 and 159 are forward biased, respectively. That is to say, the control device includes region 152 as one emitter thereof during the positive half cycle when the voltage applied to electrode 156 is positive with respect to electrode 162, but includes region 158 during the negative half cycle.

Junction 167 is formed in close physical proximity to junction 165 in this particular embodiment, so that the gain of the effective transistor portion of the control device comprising regions 150, 164 and 166 is sufficiently high that this transistor is always on. In other words, current will be conducted from region 166 across junction 167 and into region 150 when a voltage difference is applied between these regions, the magnitude of which depends upon the magnitude of the voltage difference. Moreover, junctions 165 and 167 are active to yield a substantial current gain. Thus regardless of the voltage polarity across the conduction electrodes of the main power device, the regenerative control device is "on," since one or the other of junctions 153 and 159 will be forward biased. Until a current greater than the minimum holding current of the control device is applied to electrode 136, however, the control device does not become regenerative.

A pair of series connected voltage dividing resistors 170 and 172 are connected in series with the load and the AC voltage source, and in parallel with the conduction terminals 132 and 134 of the triode switch. The control electrode 136 of the triode switch is interconnected at the interconnection of the voltage dividing resistors by circuit means that constitutes a DC switch to control the current to the control terminal.

The DC switch means comprises a device and related circuitry that operates on a current mode in a manner similar to that described earlier. In particular, the switch includes a modified unijunction transistor device comprising an n-type region 174 having a contiguous p-type region 176 forming a rectifying junction 177 therewith. An n-type region 178 of higher electrical conductivity is formed contiguous to the n-type region 174 on one end thereof, and another p-type region 180 is formed within n-type region 178 and defines a rectifying junction 181 therewith. Conduction or base electrodes 182 and 184 are attached to opposite ends of the device, with conduction terminal 184 being attached to the surface adjacent portions of both regions 178 and 180. A capacitor 186 is connected from between the voltage dividing resistors 170 and 172 at one terminal to the p-type emitter region 176 at the other terminal through an electrode 190. A variable resistor 188 is connected between electrode 190 and control electrode 136, the latter of which is also connected to the conduction electrode 184. This device is similar to a unijunction transistor in that the two electrodes 182 and 184 constitute the base electrodes and electrode 190 constitutes the emitter electrode, with region 174 constituting the channel of the device. When capacitor 186 charges to a voltage sufficient to forward bias junction 177, the device will exhibit a low impedance between the emitter electrode 190 and one or both of the base electrodes. The device differs from a unijunction transistor in the provision therein of n-type region 178 and p-type region 180. It is not characteristic of unijunction transistors to exhibit a substantially low impedance between the two base terminals when the device is caused to switch, but rather a low impedance between the emitter terminal and one of the base terminals. In order to apply a control current of sufficient magnitude to electrode 136, however, a low impedance must be exhibited between the base electrodes 182 and 184, which will then allow a relatively large current to be conducted by the integrated control device and one or other of the divider resistors.

The n-type region 178 is provided in one end of the device and constitutes a higher electrical conductivity region than region 174, so that a small current is conducted between base terminals 182 and 184 prior to the time that the device fires. This current is not sufficient to forward bias junction 181, so that the portion of region 174 adjacent p-type emitter region 176 is at a voltage intermediate the voltages applied to base terminals 182 and 184. Once capacitor 186 causes junction 177 to become forward biased, the current conducted through n-type region 178 is sufficient to cause junction 181 to become forward biased and p-type region 180 to emitter carriers to effect the reduction in resistance of region 174.

When a voltage is applied to conduction electrode 132 that is positive with respect to conduction electrode 134 (positive half cycle of the AC voltage source), the voltage established between the voltage dividing resistors 170 and 172 will be intermediate the voltage applied at the conduction electrodes. The voltage at control electrode 136 will be very nearly the voltage at conduction electrode 132, and therefore capacitor 186 will start to charge through resistors 172 and 188, and through the integrated control device through control terminal 136. Sufficient conduction through the latter is made possible by the high gain thereof. A very small current will be conducted through the unijunction type device between the base electrodes 182 and 184, so that junction 177 is initially reverse-biased. When capacitor 186 charges to a voltage sufficient to turn on this device, a larger current is conducted through the device to cause regions 174, 178 and 180 to constitute a forward biased diode. The p-type region 180 emits carriers into region 178, and the latter region modulates region 174 to greatly decrease the resistance thereof. This, in effect, is the equivalent to the closing of a switch between the divider resistors and control electrode 136 to allow the conduction by the integrated control device comprising regions 166, 164, 150 and 152 of a substantially large current to cause the latter device to become regenerative. Thus carriers are flooded into region 150 to cause the main switch device to become regenerative. On the negative half cycle of the AC voltage source, the integrated control device comprises regions 166, 164, 150 and 158, but the polarity of current flow therethrough and through the unijunction type device remains the same. To provide perfect symmetry of operation, divider resistors 170 and 172 are chosen to be equal.

Figure 8:
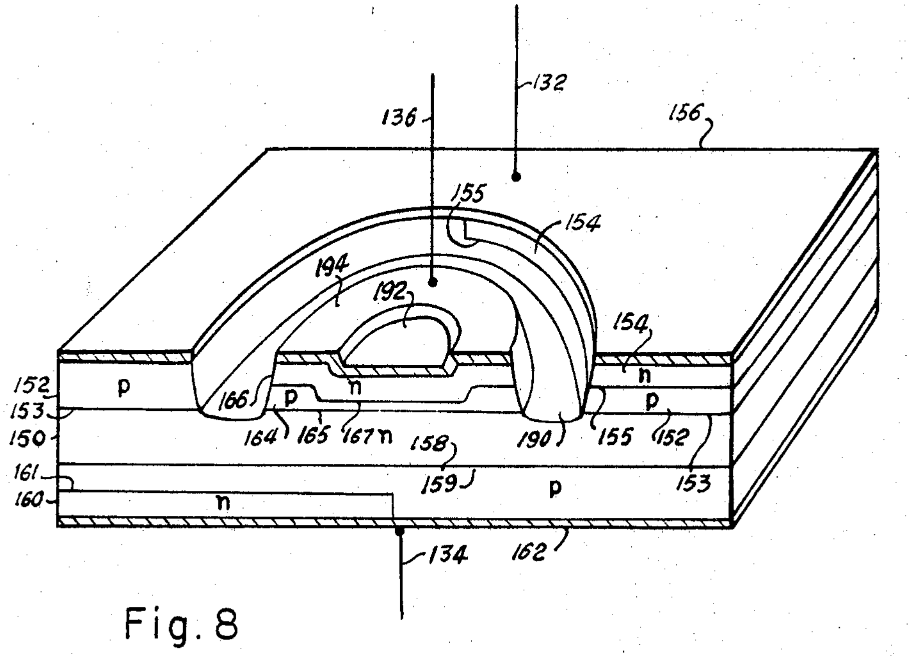
FIGURE 8 is a perspective view, in section, of one embodiment of a symmetrical semiconductor switch that can be employed as the switch shown schematically in FIGURE 7.

A perspective view, in section, of one embodiment of the semiconductor symmetrical triode type device shown schematically in FIGURE 7 is shown in FIGURE 8, wherein this particular embodiment is characterized by a mesa construction. The device comprises a main body of semiconductor material 150, such as an initial wafer of silicon of n-type conductivity, into the opposite faces of which there are diffused p-type conductivity regions 152 and 158 forming rectifying junction 153 and 159, respectively, with the n-type conductivity region. Subsequent to this diffusion, an indention 192 is etched in the center of the top surface of the wafer to bring this portion of the top surface in closer proximity to junction 153, now denoted 165. Thereafter, the wafer is suitably masked on both surfaces thereof and additional n-type regions are diffused in the two opposite surfaces. In particular, a semi-annular n-type region 154 is formed in a portion of the surface of p-type region 152 to form rectifying junction 155 therewith. Similarly, another semi-annular n-type region 160 is formed in a portion of the surface of p-type region 158 to form a rectifying junction 161 therewith. Region 160 preferably is opposite the portion of region 152 that does not include region 154 and generally coincides in area therewith. Simultaneous with these diffusions, an n-type region 166 is formed in the center portion of p-type region 152, now denoted numeral 164, to form a rectifying junction 167 therewith. Because of the indentation 192 formed in the center surface of the p-type region 152, junction 167 will be located physically very close to junction 165. The close proximity of junctions 165 and 167 impact a high gain characteristic to this portion of the device for the purpose noted above.

After the formation of these regions, an annular channel 190 is etched in the top surface of the wafer to form a mesa to isolate regions 164 and 166 from p-type region 152, whereby the annular channel penetrates rectifying junction 153 as shown. Thereafter, conduction electrodes 156 and 162 are attached to the opposite surfaces of the wafer, so that conduction electrode 156 is attached to both regions 152 and 154, and conduction electrode 162 is attached to both regions 158 and 160. A control electrode 194 is attached to region 166. Conduction terminals 132 and 134 are then attached to electrodes 156 and 162, respectively, and the control terminal 136 is attached to electrode 194.

Figure 9:
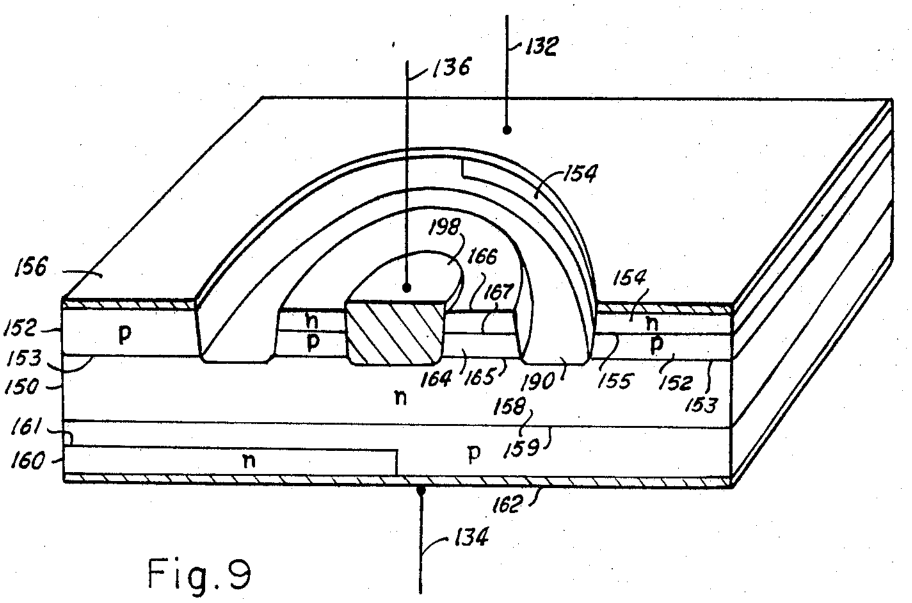
FIGURE 9 is a perspective view, in section, of another embodiment of a symmetrical semiconductor switch that can be employed as the switch shown schematically in FIGURE 7.

Another embodiment of a semiconductor symmetrical triode type switch device that can be used in the circuit of FIGURE 7 is shown in the perspective view, in section, of FIGURE 9. This device is also characterized by a mesa construction and is similar to the device just described, wherein like reference numerals again refer to like parts. It will be recalled that the integrated control device must be able to conduct current through control terminal 136 for the charging of capacitor 186. This device provides this function by employing an electrode 198 that shorts through both junctions 165 and 167, so that the control terminal is connected directly to region 150. However, junctions 165 and 167 are not required to be in close physical proximity in the same sense as the device of FIGURE 8. Current can be conducted by the control terminal 136 from n-type region 150 at all times because of this electrode. Once a substantial current is caused to flow through control terminal 136 after the unijunction type device of FIGURE 7 fires, rectifying junctions 165 and 167 become active as a result of the large carrier injection into region 150 to cause the integrated control device to become regenerative, and thus cause the main switch device to become regenerative.

Figures 10, 11, 15:
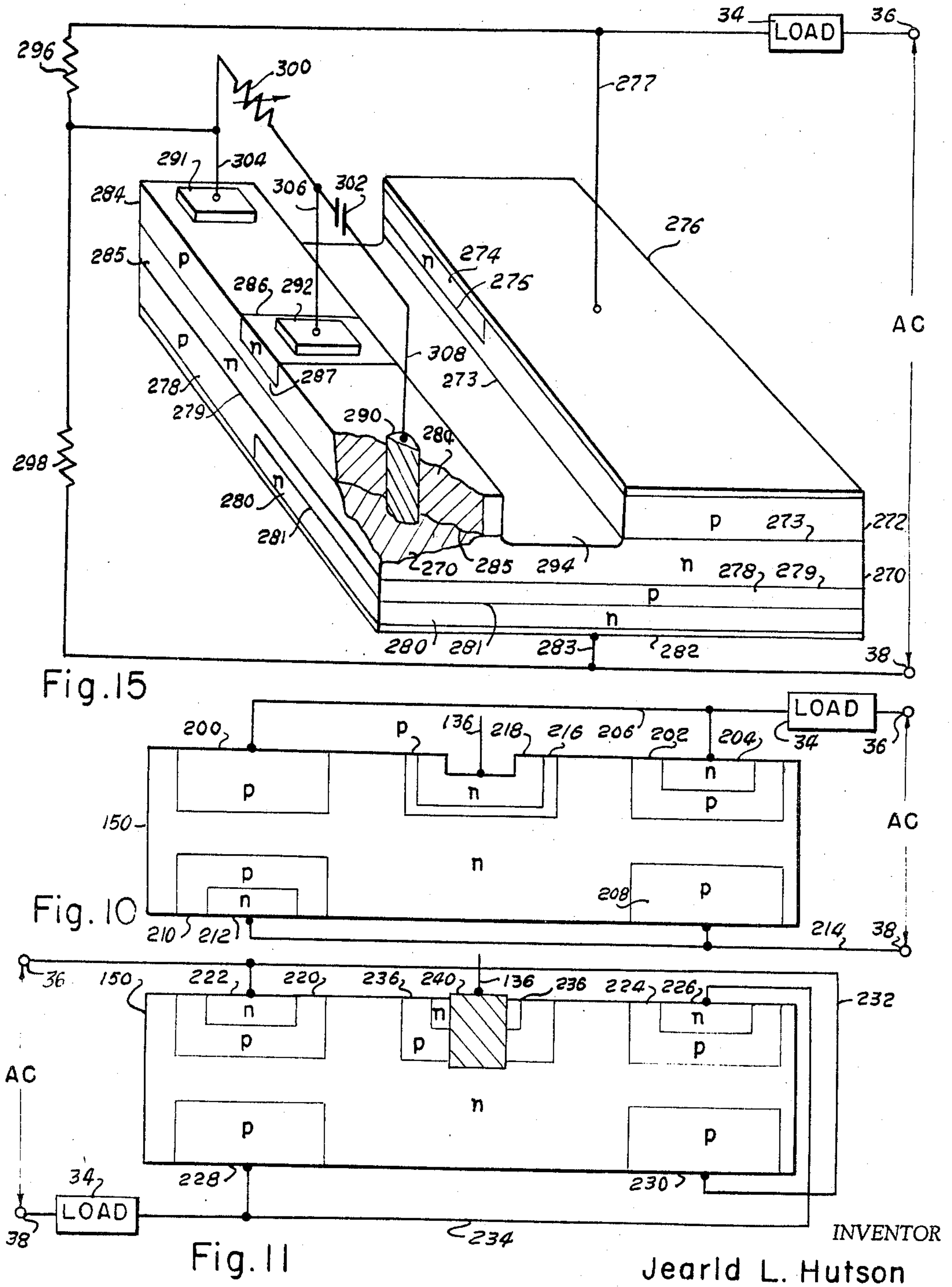
FIGURE 10 is a side elevational view, in section, of yet another embodiment of a symmetrical semiconductor switch that can be employed as the switch shown schematically in FIGURE 7.
FIGURE 11 is a side elevational view, in section, of a further embodiment of a symmetrical semiconductor switch that can be employed as the switch shown schematically in FIGURE 7.
FIGURE 15 shows still another embodiment of the system of the invention, including a perspective view, partly in section, of another symmetrical switch.

A side elevational view, in section, of yet another embodiment of a symmetrical triode type switch that can be used in the circuit of FIGURE 7 is shown in FIGURE 10. In all of the devices of FIGURES 7, 8 and 9 surface adjacent portions of the respective emitters and contiguous base regions of the switch device are shorted with an electrode, which shorting is made possible by the fact that these two regions have surface adjacent portions. The device of FIGURE 10 is essentially equivalent to the devices just described although surface adjacent portions of these particular regions are not provided. Spacially separated p-type regions 200 and 202 are formed in one surface of an n-type wafer 150, and an n-type conductivity region 204 is formed in p-type region 202. Similarly, spacially separated p-type regions 208 and 210 are provided in an opposite surface of the wafer, and an n-type region 212 is provided in p-type region 210. During the positive half cycle of the alternating voltage source, regions 200, 150, 210 and 212 are active for conduction, and during the negative half cycle of the AC voltage source, regions 204, 202, 150 and 208 are active. To connect the device in series with the load and AC voltage source, a terminal 206 is attached to both p-type region 200 and n-type region 204, thus providing a connection between these two regions. Similarly, a terminal 214 is attached to both p-type region 208 and n-type region 212 to provide a connection between these two regions. Provided in the top surface of the wafer intermediate p-type region 200 and 202 is another p-type region 216 with an n-type region 218 formed therein. Control terminal 136 is attached to n-type region 218. Thus the device of FIGURE 10 is equivalent to the devices shown in FIGURES 8 and 9, wherein the latter mentioned devices have surface adjacent portions at the opposite surfaces which are shorted by an electrode, and whereas the device of FIGURE 10 connects these two regions, although separated, by an external connection.

In the device of FIGURE 10, anode or p-type emitter 200 is provided in one surface of the device for the positive half cycle, whereas another anode or p-type emitter 208 is provided in an opposite surface of the device for the negative half cycle. In some cases, however, it is desirable to provide both of the p-type emitters in the same surface of the device, such as shown in FIGURE 11. In this case, p-type base regions 220 and 224 are formed in one surface of the wafer, and n-type emitter regions 222 and 226 are formed in these two base regions, respectively. A pair of p-type emitter regions 228 and 230 are formed in the opposite surface of the wafer opposite the two respective p-type base regions. A first connection 232 electrically interconnects the p-type emitter region 230 with the n-type emitter region 222, and is connected to the conduction terminal 132. Similarly, an electrical connection 234 interconnects the p-type emitter region 228 with the n-type emitter region 226, and is connected to the other conduction terminal 134. Another p-type region 236 is provided in the top surface of the wafer, and another n-type region 238 is provided in this p-type region. The junctions of the latter two regions can be formed physically very close together to give a high gain characteristic, or alternatively, a shorting electrode 240 can be provided in ohmic contact to regions 238, 236 and 150.

Figure 12:
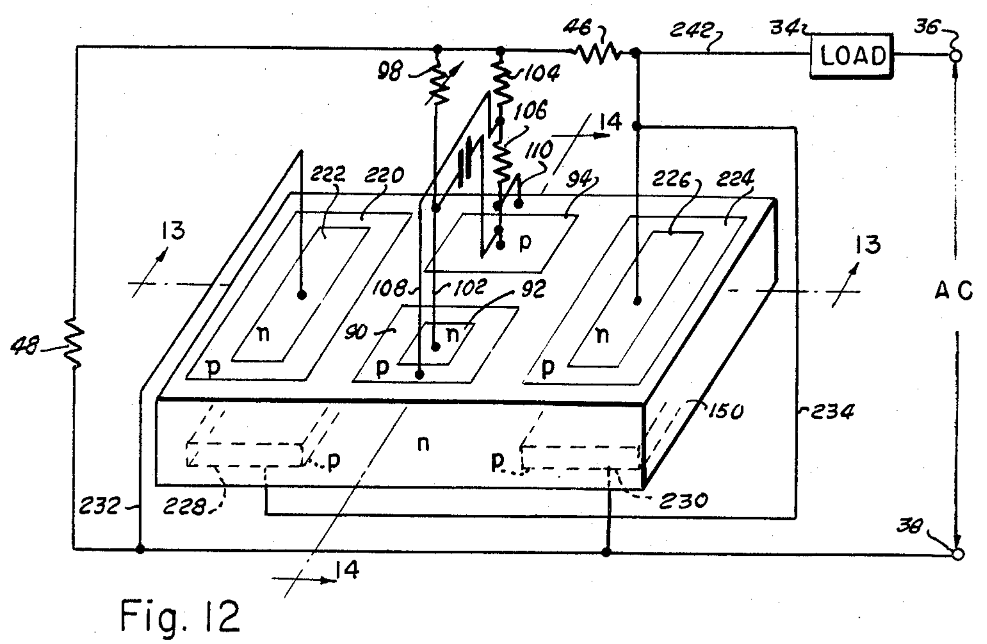
FIGURE 12 shows another embodiment of the system of the invention, including a perspective view of a symmetrical switch used therewith.

A perspective view of symmetrical triode type device that combines some of the features of the devices shown in FIGURES 4 and 11 is shown in FIGURE 12. This device incorporates a complete regenerative control device integrated within the middle n-type base region 150 of the main switch device as described in FIGURE 4, and is characterized by a construction of the main switch device as shown in FIGURE 11. Thus the main switch device is characterized by spacially separated p-type emitter regions, or anodes, 228 and 230, corresponding p-type base regions 220 and 224, and corresponding n-type emitter regions 222 and 226, to form a pair of integrated regenerative switch devices for symmetrical conduction that utilize a common n-type base region 150. The n-type emitter region 222 of one device and p-type emitter region of the other device are interconnected by connection 232, and the n-type emitter region 226 and p-type emitter region 228 are interconnected by connection 234. The main switch device portion described so far is identical to the main switch device shown in FIGURE 11.

Figure 13:
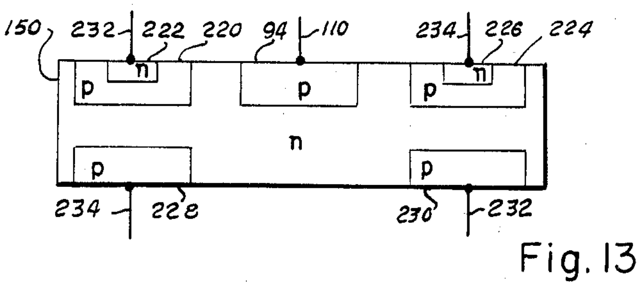
FIGURE 13 is a side elevational view, in section, taken through section lines 13–13 of FIGURE 12.
Figure 14:
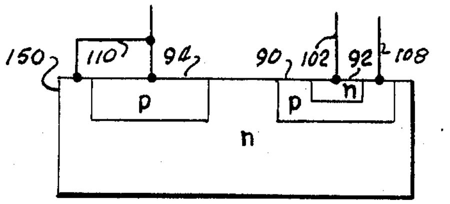
FIGURE 14 is an end elevational view, in section, taken through section lines 14–14 of FIGURE 12.

Formed in the top surface of the wafer between the spacially separated parts of the main switch device is the regenerative control device, which is wholly integrated in the n-type base region 150 and employs this region is common with the main switch device. As shown in FIGURES 4 and 5, the control device comprises p-type emitter region 94, p-type base region 90 spaced therefrom, and n-type emitter region 92 formed in base region 90. Connection 110 is attached between region 94 and a portion of region 150 on the opposite side of region 94 and region 90. The spacial separation and construction of the overall device is shown in more detail in the elevation view, in section, of FIGURE 13, taken through section lines 13—13 of FIGURE 12, and in the elevational view, in section, of FIGURE 14 taken perpendicular thereto and through section lines 14—14 of FIGURE 12. All other external connections and components are the same as shown in FIGURES 4 and 5, wherein connection 232 is interconnected with a conduction terminal 240 that is connected to the AC voltage supply, and connection 234 is interconnected with another conduction terminal 242 that is connected to the load 34 and the other terminal of the AC voltage supply. The symmetry of construction of this device will be appreciated, which results in symmetry of operation during both half cycles of the AC voltage supply.

Another embodiment that employs a unijunction transistor type function combined with a regenerative control device for controlling the operation thereof, both functions of which are integrated with a symmetrical switch type device, is shown in the perspective view, in section, of FIGURE 15. The device comprises an initial wafer 270 of semiconductor material, such as n-type conductivity silicon, for example, into the opposite faces of which there are formed p-type regions 272 and 278 defining junctions 273 and 279, respectively with region 270. Thereafter n-type regions 274 and 280 are formed in regions 272 and 278, respectively, forming junctions 275 and 281 therewith, and in this embodiment regions 272 and 274 have surface adjacent portions as do regions 278 and 280. Again, region 274 is opposite the portion of region 278 that does not include region 280, and vice-versa. Electrode 276 is attached to both regions 277 and 274, and electrode 282 is attached to both regions 278 and 280. Terminals 277 and 283 are attached to electrodes 276 and 282, respectively.

After the aforementioned regions are formed, a channel 294 is etched in the top surface of the device through rectifying junction 273 to isolate a distinct p-type region 284. During the time that n-type region 274 is formed, another n-type region 286 is formed in the portion of region 272 that becomes region 284. Region 284 now defines a separate junction 285 with the middle base region 270, and region 286 defines a junction 287 with region 284.

An electrode 290 is attached to one end of region 284 so that it penetrates junction 285 to ohmically contact both regions 284 and 270. Another electrode 291 is attached to the opposite end of region 204 on the other side of region 286, and another electrode 292 is attached to region 286. A pair of series connected voltage divider resistors 296 and 298 are interconnected with conduction terminals 277 and 283 and the load and source of AC voltage. A variable resistor 300 is connected at one terminal to between the voltage divider resistors and at the other terminal to electrode 292 through connection or terminal 306. A capacitor 302 is connected between electrodes 292 and 290 through connections 306 and 308, respectively. A connection or terminal 304 connects electrode 291 to between the voltage divider resistors.

Region 284 constitutes a unijunction type transistor employing electrodes 290 and 291 as the base electrodes thereof and electrode 292 as the emitter electrode thereof. During either half cycle of the AC voltage source, a relatively positive voltage is applied to electrode 290 thereof through one or the other of forward biased junctions 273 and 279 depending upon the polarity of applied voltage, with respect to the voltage applied to electrode 291 through the voltage divider resistors. Thus a small current is conducted along the length of region 284 to produce a voltage at the portion of this region adjacent emitter region 286 that is intermediate the voltage of these two base electrodes. Initially, emitter 286 is positive with respect to this intermediate voltage in the p-type channel adjacent thereto, so that junction 287 is reverse biased. As capacitor 302 charges, a voltage will be developed at region 286 in a time determined by the RC time constant of capacitor 302, resistor 300 and one of the voltage divider resistors to forward bias junction 287 and cause the unijunction type device to fire. Upon this occurrence, a low impedance is established between electrodes 292 and 290. The increase in current region 284 and electrode 290 to become forward biased, and the portion of region 284 in the vicinity of electrode 290 to emit or inject carrier into region 270. In so doing, the integrated control device, which now constitutes region 286, the portion of region 284 immediately adjacent thereto, n-type region 270 between region 286 and electrode 290, and the end of region 284 adjacent electrode 290, becomes regenerative to flood region 270 with carriers. This causes the main switch device to become regenerative as described above.

Many of the various features and advantages of the invention have been described with reference to particular embodiments thereof, wherein many other embodiments that constitute modifications and substitutions that do not depart from the scope of the invention can undoubtedly be devised. Reference to particular semiconductor material should not be construed as limiting, since many other materials can be used. Moreover, the conductivity types of the various regions can be interchanged, as desired. Particular dimensions, conductivities and impurity doping levels have not been given, as these parameters will be readily evident to those skilled in the art in view of the foregoing disclosure. Accordingly, it is intended that the invention be limited only as defined in the appended claims.

What is claimed is:

1. An electronic switch system comprising:

(a) a semiconductor switch element including first and second integrated regenerative devices having at least one active region common to both, (b) said first device including first and second electrodes attached thereto, and characterized by a normally high impedance therebetween, but which becomes regenerative to exhibit a low impedance between said first and said second electrodes upon the injection of current carriers in the said at least one common region in the presence of a voltage applied across said first and said second electrodes, (c) said second device including a third electrode attached thereto, and becoming regenerative to inject current carriers in said at least one common region when a control current is applied to said third electrode, (d) said second device also including a first region to which said third electrode is attached, a second region contiguous to said first region and forming a first rectifying junction therewith, and a third region contiguous to said second region and forming a second rectifying junction therewith, said first and said second rectifying junctions having a spacial separation sufficiently small therebetween to permit said control current to be conducted between said first and said third regions in the absence of an external biasing voltage applied between said first and said second regions, and (e) circuit means interconnecting said third electrode with said first and said second electrodes to apply said control current to said third electrode responsive to a voltage applied to said first and said second electrodes.

2. An electronic switch system as set forth in claim 1 wherein said circuit means includes voltage divider means interconnected between said first and said second electrodes for deriving a voltage intermediate the voltage applied across said first and said second electrodes, a third device including first and second conduction electrodes and a control electrode attached thereto, said first and said second conduction electrodes being connected to said voltage divider means and said third electrode, respectively, said third device being characterized by a normally high impedance between said first and said second conduction electrodes but which switches to a low impedance between said first and said second conduction electrodes when a control signal is applied to said control electrode thereof in the presence of a voltage applied across said first and said second conduction electrodes, and reactance means interconnected with said voltage divider means, said control electrode of said third device and said third electrode of said second device for applying said control signal to said control electrode responsive to said intermediate voltage.

3. An electronic switch system as set forth in claim 2 wherein said third device comprises a unijunction transistor in which said first and said second conduction electrodes correspond to the base electrodes thereof, and said control electrode corresponds to the emitter electrode thereof.

4. An electronic switch system as set forth in claim 3 wherein said unijunction transistor includes a channel region of one electrical conductivity type to which said first and said second base electrodes are attached, an emitter region of the opposite electrical conductivity type to which said control electrode is attached contiguous to said channel region and forming a rectifying junction therethrough, and another region of said opposite electrical conductivity type to which one of said base electrodes is also attached contiguous to said channel region and forming a rectifying junction therewith, said channel region and said another region of said opposite electrical conductivity type constituting a forward biased diode to modulate the conductivity of said channel region when said control signal is applied to said control electrode.

5. An electronic switch system as set forth in claim 4 wherein said channel region comprises a first zone of said one electrode conductivity type having a first electrical conductivity and a second zone of said one electrical conductivity type having a second electrical conductivity higher than said first electrical conductivity, and said other region of said opposite electrical conductivity type is contiguous to said second zone.

6. An electronic switch system comprising:

(a) a semiconductor switch element including first and second integrated regenerative devices having at least one active region common to both, (b) said first device including first and second electrodes attached thereto, and characterized by a normally high impedance therebetween, but which becomes regenerative to exhibit a low impedance between said first and said second electrodes upon the injection of current carriers in the said at least one common region in the presence of a voltage applied across said first and said second electrodes, (c) said second device including first, second and third successively contiguous regions and a third electrode attached to all of said first, said second and said third regions, and becoming regenerative to inject current carriers in said at least one common region when a control current is applied to said third electrode, and (d) circuit means interconnecting said third electrode with said first and said second electrodes to apply said control current to said third electrode responsive to voltage applied across said first and said second electrodes.

7. An electronic switch system comprising:

(a) a semiconductor switch element including first and second integrated regenerative devices having at least one active region common to both, (b) said first device including first and second electrodes attached thereto and characterized by a normally high impedance therebetween, but which becomes regenerative to exhibit a low impedance between said first and said second electrodes upon the injection of current carriers in said at least one common region in the presence of a voltage applied across said first and said second electrodes, (c) said second device including a pair of adjacent regions of opposite electrical conductivities forming a rectifying junction therebetween, and third and fourth electrodes attached to said pair of regions, respectively, and becoming regenerative to inject current carriers in said at least one common region when said rectifying junction is forward biased to apply a control current to said second device, and (d) circuit means comprising voltage divider means interconnecting one of said third and said fourth electrodes with said first and said second electrodes for applying to said one of said third and said fourth electrodes a voltage intermediate the magnitude to said voltage applied across said first and said second electrodes, and reactance means connected to the other of said third and fourth electrodes responsive to the voltage applied across said first and said second electrodes to forward bias said rectifying junction between said pair of regions in conjunction with said voltage divider means a predetermined time interval after said voltage is applied across said first and said second electrodes.

8. An electronic switch system as set forth in claim 8 wherein said one of said pair of regions of said second device and one of said two extreme regions of said first device constitute spacially separated parts of a single electrical conductivity, continuous zone of said switch element.

9. An electronic switch system as set forth in claim 8 wherein said one of said other two regions of said first device constitutes said at least one active region common to both said first and said second devices.

10. An electronic switch system as set forth in claim 12 wherein said first device includes four successively contiguous regions of alternate electrical conductivity types forming rectifying junction between contiguous regions, said first and said second electrodes are attached to two regions, respectively, of said four regions that are separated by the other two regions of said four regions; and one of said pair of regions of one conductivity type of said second device is contiguous with one of said other two regions of said first device of an opposite electrical conductivity type and forming a rectifying junction therewith.

11. An electronic switch system as set forth in claim 10 wherein said reactance means is variable.

12. An electronic switch system comprising:

(a) a semiconductor switch including first and second integrated regenerative devices having a first active region of one electrical conductivity type common to both, (b) said first device including first and second electrodes attached thereto and characterized by a normally high impedance therebetween, but which becomes regenerative to exhibit a low impedance between said first and said second electrodes upon the injection of current carriers in said first region in the presence of a voltage applied across said first and said second electrodes, (c) said second device including a second region of opposite electrical conductivity type contiguous to said first region and forming a rectifying junction therewith, a third region of said one electrical conductivity type contiguous to said second region and forming a rectifying junction therewith, a fourth region of said opposite electrical conductivity type contiguous to said first region and forming a rectifying junction therewith and spaced from said second and said third regions, third and fourth electrodes attached to said second and third regions, respectively, a fifth electrode attached to said fourth region and said first active region of said one electrical conductivity type, the said second device becoming regenerative to exhibit a low impedance between said fourth and said fifth electrodes in the presence of a voltage applied thereacross to inject current carriers in said first active region when said rectifying junction between said second and said third regions is forward biased to apply a control current to said second device.

13. An electronic switch system as set forth in claim 12 including circuit means comprising a voltage divider interconnected with said first, said second and at least one of said third and said fourth electrodes for applying to said at least one of said third and said fourth electrodes a voltage intermediate the voltage applied across said first and said second electrodes.

14. An electronic switch system as set forth in claim 12 wherein said first device is characterized by the conduction of current in either direction between said first and said second electrodes, when regenerative, as determined by the polarity of voltage applied across said first and said second electrodes, and includes fifth and sixth regions of opposite electrical conductivity types contiguous to said first region and forming rectifying junctions therewith, and said first and said second electrodes are attached to said fifth and said sixth regions, respectively; said fifth electrode is attached to both said fourth region and said first region; and circuit means including a voltage divider interconnected with said first, said second and said fourth electrodes for applying to said fourth electrode a voltage intermediate to voltage applied across said first and said second electrodes, a capacitor connected between said fourth and said fifth electrodes, and impedance means interconnecting said voltage divider means, said third electrode and said fifth electrode for applying to said third electrode another voltage intermediate the voltage applied across said first and said second electrodes which is different from said first mentioned intermediate voltage.

15. An electronic switch system as set forth in claim 14 wherein said first device includes seventh and eighth regions of said one electrical conductivity type contiguous to said fifth and said sixth regions, respectively, forming rectifying junctions therewith, said first electrode is attached to both said fifth and said seventh regions, and said second electrode is attached to both said sixth and said eighth regions.

16. An electronic switch system as set forth in claim 15 wherein said fifth and said seventh regions have surface adjacent portions, and said sixth and said eighth regions have surface adjacent portions.

17. An electronic switch system comprising:

(a) a semiconductor switch element including first and second integrated regenerative devices having at least one active region common to both, (b) said first device including four successively contiguous regions of alternate electrical conductivity types forming rectifying junctions between contiguous regions, (c) first and second electrodes attached to two extreme regions, respectively, of said four regions of said first device that are separated by the other two regions of said four regions, (d) said second device including a first region of one conductivity type contiguous to one of said other two regions of said first device and forming a rectifying junction therewith, a second region of an opposite electrical conductivity type contiguous to said first region and forming a rectifying junction therewith, and including one of said two extreme regions of said first device and said one of said other two regions of said first device contiguous therewith and common with said first device, (e) third and fourth electrodes attached to said second region and said first region, respectively, of said second device, and (f) circuit means comprising first and second series connected resistors interconnected with said first and said second electrodes and connected at the interconnection thereof to said fourth electrode, a capacitor connected between said third electrode and one of said first and said second electrodes, and a variable resistor connected between said third electrode and the other of said first and second electrodes.

18. An electronic switch system comprising:

(a) a semiconductor switch element including first and second integrated regenerative devices, (b) said first device including a first region of one electrical conductivity type, second and third spaced apart regions of an opposite electrical conductivity type contiguous to said first region and forming rectifying junctions therewith, fourth and fifth spaced apart regions of said opposite electrical conductivity type contiguous to said first region and forming rectifying junction therewith, six and seventh regions of said one electrical conductivity type contiguous to said fourth and said fifth regions, respectively, and forming rectifying junctions therewith, a first electrode attached to both said second and said seventh regions and a second electrode attached to both said third and said sixth regions;

(c) said second device including an eighth region of said opposite electrical conductivity type contiguous to said first region of said first device and forming a rectifying junction therewith and disposed intermediate said fourth and said fifth regions of said first device, a ninth region of said one electrical conductivity type contiguous to said eighth region and forming a rectifying junction therewith, a tenth region of said opposite electrical conductivity type spaced from said eighth region contiguous to said first region of said first device and forming a rectifying junction therewith and disposed intermediate said fourth and said fifth regions of said first device, a third electrode attached to said ninth region, a fourth electrode attached to said eight region, and a fifth electrode attached to both said tenth region and an adjacent portion of said first region of said first device disposed on the opposite side of said tenth region as said eighth region; and (d) circuit means including first and second series connected resistors interconnected with said first and said second electrodes, a capacitor connected between said third and said fifth electrodes, a variable resistor connected between said third electrode and the interconnection of said first and said second resistors, and third and fourth series connected resistors connected between the interconnection of said first and said second resistors and said fifth electrode, and said fourth electrode being connected to the interconnection of said third and said fourth series connected resistors.

19. (a) a first regenerative component having first and second electrodes attached thereto, (b) a second regenerative component integrated with said first component to include at least one active region shared in common therewith, (c) said first component being characterized by a normally high impedance between said first and said second electrodes but becoming regenerative to exhibit a low impedance therebetween upon the injection of current carriers in said at least one active region in the presence of a voltage applied across said second electrodes, (d) said first component including at least five successively contiguous regions of alternate electrical conductivity types forming rectifying junctions between contiguous regions, said first and said second electrodes are attached to two extreme regions, respectively, of said at least five regions that are separated by the other of said at least five regions, (e) said second component including first and second contiguous regions forming a rectifying junction therebetween at least one of which is not shared in common with said first component, (f) third and fourth electrodes attached to said first and said second regions, respectively, and (g) said second component including a third region spacially separated from said first and said second regions, none of said first, said second, nor said third regions being shared in common with said first component, said second and said third regions being contiguous to said at least one active common region and forming rectifying junctions therewith and a fifth electrode attached to said third region of said first component, (h) said second component becoming regenerative to inject current carriers in said at least one active region when said rectifying junction is forward biased to conduct a current thereacross in the presence of a voltage applied across said second component.

20. A semiconductor device as set forth in claim 19 wherein said fifth electrode is also attached to said at least one active common region.

21. An electronic switch system comprising:

(a) a semiconductor switch element including first and second integrated regenerative devices having at least one active region common to both, (b) said first device having first and second electrodes attached thereto and characterized by a normally high impedance therebetween, but which becomes regenerative to exhibit low impedance between said first and said second electrodes upon the injection of current carriers in said at least one common region in the presence of a voltage applied across said first and said second electrodes, (c) said first device including a first region of one electrical conductivity type, a second region of an opposite electrical conductivity type contiguous to said first region and forming a rectifying junction therewith, a third region of said one electrical conductivity type contiguous to said second region and forming a rectifying junction therewith, said first electrode being attached to both said second and said third regions, a fourth region of said opposite electrical conductivity type contiguous to said first region and forming a rectifying junction therewith, and a fifth region of said one electrical conductivity type contiguous to said fourth region forming a rectifying junction therewith, said second electrode being attached to both said fourth and said fifth regions, (d) said second device having a third electrode attached thereto and becoming regenerative to inject current carriers in said at least one common region when a control current is applied to said third electrode, (e) said second device including a sixth region of said opposite electrical conductivey type contiguous to said first region of said first device and forming a rectifying junction therewith, a seventh region of said one electrical conducting type contiguous to said sixth region intermediate the ends thereof and forming a rectifying junction therewith, said third electrode is attached to said seventh region, a fourth electrode attached to said sixth region adjacent one end thereof spaced from said seventh region, and a fifth electrode attached to both said first region of said first device and the other end of said sixth region spaced from said seventh region and on the opposite side of said seventh region as said fourth electrode, and (f) circuit means comprising first and second series connected resistors interconnected with said first and second electrodes, said fourth electrode being connected to the interconnection of said first and said second resistors to establish a voltage drop along said sixth region between said fourth and said fifth electrodes when a voltage is applied across said first and said second electrodes, and reactance means interconnecting said third and said fifth electrodes with the interconnection of said first and said second resistors to establish a forward bias across the junction between said sixth and said seventh regions responsive to said voltage applied across said first and said second electrodes.

22. A semiconductor device comprising:

(a) a first region of one electrical conductivity type, (b) a second region of an opposite electrical conductivity type contiguous to said first region intermediate the end thereof and forming a rectifying junction therewith, (c) first and second electrodes attached to opposite ends of said first region, (d) a third electrode attached to said second region, (e) a third region of said opposite electrical conductivity type contiguous to said first region at one end thereof and forming a rectifying junction therewith with one of said first and said second electrodes being attached to both said third and said first regions at said one end, and (f) said first region including a first zone of a first electrical conductivity contiguous to said second region, and a second integral zone of a second electrical conductivity greater than said first conductivity to which one of said first and said second electrodes is attached to which said third region is contiguous.

23. A semiconductor device as set forth in claim 22 wherein said third region of said opposite electrical conductivity type and said second zone of said first region have surface adjacent portions.

References Cited

UNITED STATES PATENTS

| | | |
|---|---|---|
| 3,264,518 | 8/1966 | Stauverman. |
| 3,274,463 | 9/1966 | Hutson. |
| 3,275,909 | 9/1966 | Gutzwiller. |
| 3,317,746 | 5/1967 | Hutson. |
| 3,328,652 | 6/1967 | Sylvan. |
| 3,346,785 | 10/1967 | Beaudouin. |

FOREIGN PATENTS

| | | |
|---|---|---|
| 910,656 | 11/1962 | Great Britain. |
| 945,249 | 12/1963 | Great Britain. |

JOHN W. HUCKERT, Primary Examiner

J. D. CRAIG, Assistant Examiner

U.S. Cl. X.R.

307—299, 301, 303, 305